US005588325A

United States Patent [19]

Green et al.

[11] Patent Number: 5,588,325
[45] Date of Patent: Dec. 31, 1996

[54] AUXILIARY POWER TAKE OFF ASSEMBLY AND METHOD

[75] Inventors: Norman E. Green, Harper; Kenneth V. Sowers, Kingman, both of Kans.

[73] Assignee: DewEze Manufacturing, Inc., Harper, Kans.

[21] Appl. No.: 453,921

[22] Filed: May 30, 1995

[51] Int. Cl.$^6$ .............................. B60K 25/02; F16H 7/02

[52] U.S. Cl. .................. 74/15.63; 29/892.1; 123/198 C; 180/53.8; 403/273; 417/362

[58] Field of Search ....................... 74/15.63; 123/198 C; 180/53.4, 53.8; 474/166, 167, 170; 403/28, 273; 29/892, 892.1, 892.11, 892.2, 892.3; 417/362

[56] References Cited

U.S. PATENT DOCUMENTS

| | | | |
|---|---|---|---|
| 1,657,747 | 1/1928 | Halmet . | |
| 2,875,746 | 3/1959 | Brice et al. | 180/53.8 |
| 3,349,631 | 10/1967 | Schalpman et al. . | |
| 3,383,927 | 5/1968 | Suchy . | |
| 3,398,587 | 8/1968 | Martin . | |
| 3,483,763 | 12/1969 | Enters . | |
| 3,828,878 | 8/1974 | Clapsaddle, Jr. . | |
| 4,031,761 | 6/1977 | Fisher et al. | 74/15.63 |
| 4,116,401 | 9/1978 | Evert et al. | 242/68.3 |
| 4,129,043 | 12/1978 | Ishikawa | 74/15.63 |
| 4,158,248 | 6/1979 | Palmer | 180/53.4 X |
| 4,241,614 | 12/1980 | Gould et al. . | |
| 4,631,973 | 12/1986 | Eley | 403/273 X |
| 4,763,744 | 9/1988 | McVicar et al. | 180/53.7 |
| 4,787,132 | 11/1988 | Kilgore | 29/477 X |
| 4,811,614 | 3/1989 | Lasoen . | |
| 4,838,101 | 6/1989 | Dobberpuhl et al. . | |
| 5,040,615 | 8/1991 | Fletcher . | |
| 5,094,309 | 3/1992 | Vlaanderen et al. | 180/53.8 X |
| 5,197,423 | 3/1993 | Ebesu et al. | 123/198 C X |

FOREIGN PATENT DOCUMENTS

| | | | |
|---|---|---|---|
| 62-96737 | 5/1987 | Japan | 123/198 C |
| 3-92426 | 4/1991 | Japan | 74/15.63 |

*Primary Examiner*—Charles A. Marmor
*Assistant Examiner*—Troy E. Grabow
*Attorney, Agent, or Firm*—Litman, McMahon and Brown, L.L.C.

[57] ABSTRACT

An auxiliary PTO assembly is designed for attaching a front mounted auxiliary rotary driven hydraulic pump to an OEM truck engine. The PTO assembly includes an auxiliary belt drive pulley which is formed by a ring which is shrink-fitted around a harmonic balancer which forms a portion of an OEM fan drive pulley. A bracket attached to the OEM engine is adapted to hold the hydraulic pump and a plurality of idler and tensioner pulleys. Installation of the inventive assembly is relatively simple and straight forward and entails virtually no modification of the OEM components. The entire PTO assembly including the auxiliary drive belt and the hydraulic pump are accommodated behind the original position of the OEM cooling fan such that the fan shaft does not need to be extended.

11 Claims, 1 Drawing Sheet

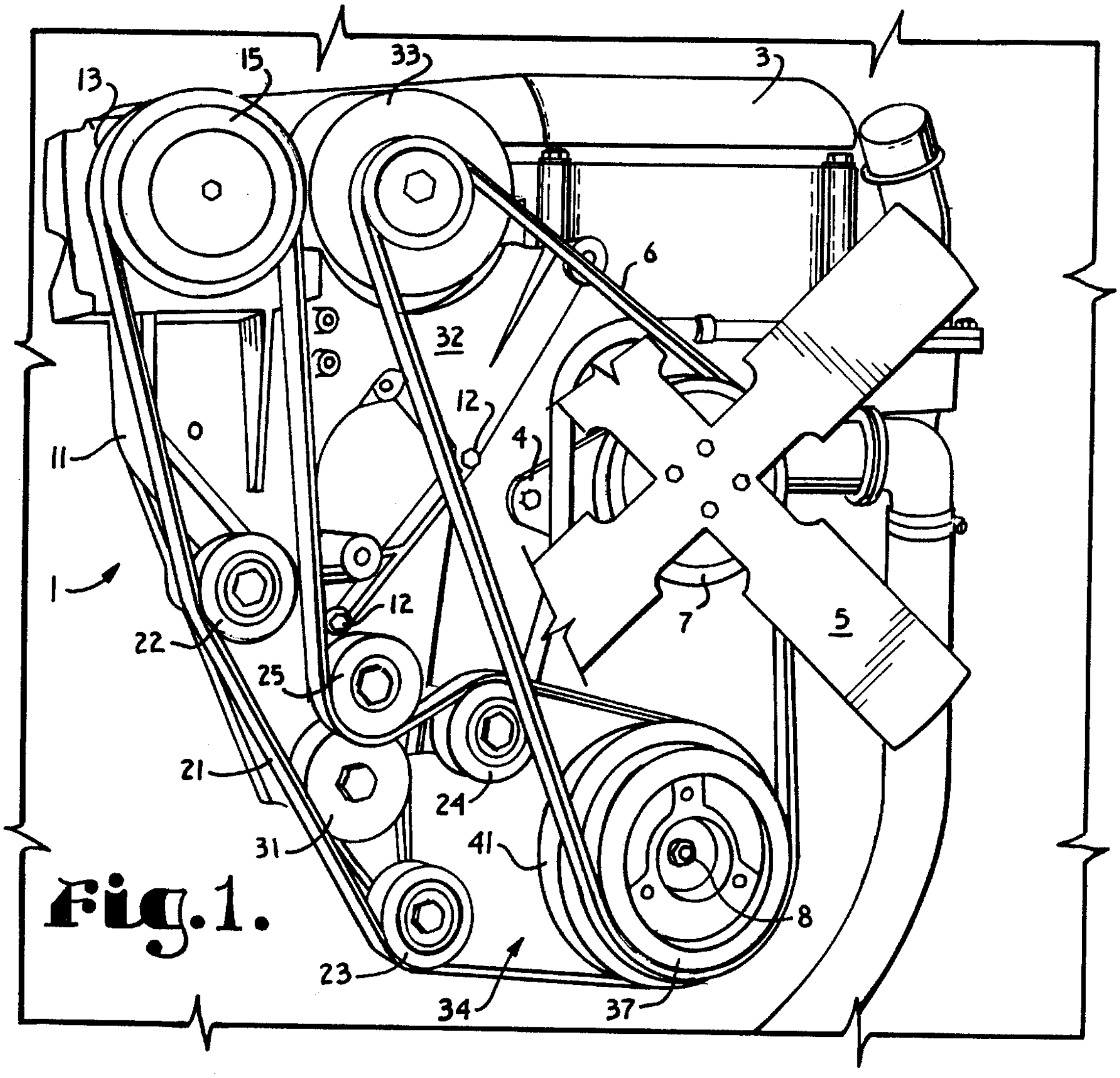
Fig.1.
Fig.2.
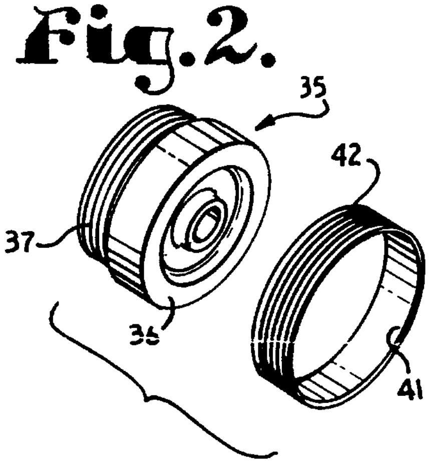
Fig.3.
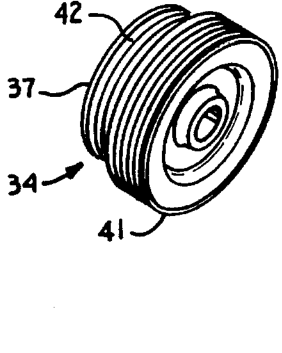

AUXILIARY POWER TAKE OFF ASSEMBLY AND METHOD

BACKGROUND OF THE INVENTION

1. Field of the Invention

This invention is directed to an auxiliary power take-off assembly and method for a truck, and, more particularly, to such an assembly which mounts and drives a hydraulic pump or the like via an auxiliary drive belt. The auxiliary drive belt is driven via an auxiliary drive pulley attached immediately behind a fan pulley provided by the original engine manufacturer.

2. Description of the Related Art

Power take-off (PTO) assemblies for adapting an original equipment manufacturer's (OEM) engine on a tractor or truck to drive an auxiliary device, such as a front mounted hydraulic pump or the like, are well known.

In known PTO assemblies, the auxiliary hydraulic pump is typically located within the engine compartment intermediate the engine and the coolant radiator. In such assemblies, an auxiliary belt drive pulley is typically attached to the engine crankshaft between an OEM drive pulley and the cooling radiator. The attachment of such an auxiliary drive pulley in front of the OEM pulley necessitates attaching an extension on the crankshaft to accommodate the auxiliary pulley. Also, an extension is required on the water pump shaft to thereby move the cooling fan forward toward the radiator to accommodate the auxiliary drive belt. This known arrangement presents a number of problems.

The attachment of an auxiliary drive pulley in front of the OEM pulley on the crankshaft increases the bending load on the crankshaft. In addition, the attachment of an extension to the water pump shaft substantially increases the load on the water pump shaft due to the increased torque from the fan extension. Furthermore, the movement of the fan forward toward the radiator tends to decrease the effectiveness of air flow from the fan, thus increasing the heat load on the radiator, and the reduced spacing between the fan and the radiator increases the chances of the fan hitting the radiator.

It is clear hen, that a need exists for a PTO assembly and method for allowing an auxiliary rotary drive implement, such as a hydraulic pump, to be added to an OEM engine. Such an assembly and method should preferably be capable of installation without the need to move the OEM cooling fan forward toward the radiator. Furthermore, such an assembly and method should be relatively simple to install and should minimize alterations to OEM equipment.

SUMMARY OF THE INVENTION

In the practice of the present invention, an auxiliary PTO assembly is designed for attaching a front mounted auxiliary rotary drive implement, such as a hydraulic pump, to an OEM engine on a truck, for example. The PTO assembly includes an auxiliary belt drive pulley to which is added to an OEM drive pulley. The auxiliary pulley includes a shrink-fit ring sized to fit around an OEM harmonic balancer attached behind the OEM pulley. A bracket attached to the OEM engine between the engine and a cooling fan is adapted to hold the hydraulic pump and a plurality of idler pulleys. An auxiliary drive belt is threaded around the auxiliary drive pulley, through the idler pulleys and around a drive sheave on the hydraulic pump. The idler pulleys include a spring tensioner to provide adequate belt tension to drive the hydraulic pump.

Installation of the inventive assembly is relatively simple and straight forward and entails virtually no modification of the OEM components. The entire PTO assembly including the auxiliary drive belt and the hydraulic pump are accommodated behind the original position of the OEM cooling fan such that the fan does not need to be extended forward toward the radiator.

OBJECTS AND ADVANTAGES OF THE INVENTION

The principle objects and advantages of the present invention include: to provide an improved PTO assembly and method for attaching an auxiliary rotary drive apparatus to an OEM engine; to provide such an assembly with an auxiliary belt drive pulley including a shrink-fit ring sized for attachment over an OEM harmonic balancer; to provide such an assembly in which an auxiliary PTO drive belt is accommodated behind the OEM fan with no fan extension required; to provide such an assembly which causes no added bending load on the engine crankshaft, which does not increase water pump shaft loading, and which does not add any significant additional heat load to the OEM radiator; to provide such an assembly and method which installs simply and efficiently on an OEM engine with minimal alterations to the OEM equipment; and to provide such an assembly which is reliable and economical to manufacture, and an assembly and method which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an auxiliary PTO assembly and hydraulic pump in accordance with the present invention installed on an OEM truck engine.

FIG. 2 is an exploded perspective view of an OEM belt drive pulley and a shrink-fit ring adaptor prior to installation on the OEM pulley.

FIG. 3 is a perspective view of an OEM belt drive pulley with the shrink-fit ring adaptor installed thereon.

Detailed Description of the Invention

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. The words "inward" and "outward" will refer to directions toward and away from, respectively, the geometric center of the embodiment being described and designated parts thereof. Said terminology will include the words specifically mentioned, derivatives thereof and words of a similar import.

2. PTO Assembly and Method

Referring to the drawings in more detail the reference numeral 1 generally designates an auxiliary power take-off assembly in accordance with the present invention. In FIG. 1, the assembly 1 is shown installed on a truck OEM engine 3. The engine 3 includes a water pump 4 and a cooling fan 5. The water pump 4 ms driven by a drive belt 6 surrounding a sheave 7 attached to the water pump 4.

The PTO assembly 1 includes a mounting bracket 11, which is attached to the front of the OEM engine 3 via a plurality of attachment bolts 12. A conventional rotary driven hydraulic pump 13 is mounted on the front of the bracket 11 and the pump 13 includes a clutch (not shown) with a sheave 15 around which is placed an auxiliary drive belt 21. Three idler pulleys 22–24 are attached to the bracket 11, and the drive belt 21 is threaded through the idler pulleys 22–24. In addition, a tensioning pulley 25 is attached to a spring housing 31 within which a spring (not shown) urges the tensioning pulley 25 downward and outward to place constant tension on the belt 21.

The assembly 1 also includes an alternator mounting bracket 32 to which an OEM alternator 33 is remounted after the assembly 1 is installed on the engine 3. An auxiliary belt drive pulley 34 includes an OEM drive pulley 35 in a manner described below.

Referring to FIG. 2, the OEM belt drive pulley 35 is shown removed from the engine crankshaft 8. Forming a portion of the OEM drive pulley 35 is an OEM harmonic balancer 36, which is somewhat larger in diameter than a sheave 37 on the OEM pulley 35. The inventive assembly 1 includes a machined steel ring 41 with an inside diameter approximately 0.005 inch smaller than the outside diameter of the OEM harmonic balancer 36. In installing the ring 41 over the harmonic balancer 36, the harmonic balancer 36 is first machined to yield a true outside diameter. The ring 41 is then heated to a temperature of approximately 400 degrees Fahrenheit, which temperature is sufficient to allow the ring 41 to expand to a diameter slightly larger than the machined harmonic balancer 36. The heated, expanded ring 41 is then placed around the trued harmonic balancer 36 and allowed to cool, with the combination of the harmonic balancer 36 and the shrink-fit ring 11 thus resulting in the auxiliary belt drive pulley 34, as illustrated in FIG. 3. Preferably the ring 41, like the OEM sheave 37, is equipped with grooves 42 to facilitate the attachment of the belts 21 and 6, respectively.

The OEM pulley 35, with the shrink-fit ring 41 installed over the harmonic balancer 36 to yield the auxiliary pulley 34, is then reinstalled on the engine 3, as shown in FIG. 1. The auxiliary drive belt 21 is then threaded around the shrink-fit ring 41 on the auxiliary drive pulley 34. Since the sheave 41 is positioned behind the sheave 37, the auxiliary belt 21 can be installed without interfering with the OEM cooling fan 5 or other OEM equipment such as the alternator 33. Thus, unlike the prior art, no crankshaft extension is required and no fan extension needs to be added to the water pump 4.

The inventive assembly 1 is illustrated for attachment to a 1994 Ford truck with a 7.3 liter direct injection diesel engine. PTO assemblies for other truck models, although similar in concept, may differ somewhat in appearance.

It is to be understood that while certain forms of the present invention have been illustrated and described herein, it is not to be limited to the specific forms or arrangement of parts described and shown.

What is claimed and desired to be secured by Letters Patent is as follows:

1. A PTO assembly for attachment of a rotary driven power unit to an OEM engine, said engine including a cooling fan and a fan belt which is attached between a drive pulley attached to an engine crankshaft and said cooling fan, said drive pulley including a sheave and a circular harmonic balancer positioned behind said sheave, said assembly comprising:

a. a pulley ring shrink-fit over said harmonic balancer, said pulley ring being equipped with one or more external grooves to facilitate placement and retention of a drive belt thereon; and b. an auxiliary drive belt placed around said pulley ring and a sheave on said rotary driven power unit to thereby drive said power unit.

2. An assembly as in claim 1, wherein:

a. said power unit is a hydraulic pump.

3. An assembly as in claim 1, and further comprising:

a. a mounting bracket for attaching said power unit to said OEM engine.

4. An assembly as in claim 3, and further comprising:

a. at least one idler pulley attached to said bracket for directing said auxiliary drive belt.

5. An assembly as in claim 4, and further comprising:

a. a tensioning pulley attached to said bracket for tensioning said auxiliary drive belt.

6. A PTO assembly for attachment of a rotary driven hydraulic pump to an OEM engine, said engine including a cooling fan and a fan belt which is attached between an OEM drive pulley attached to an engine crankshaft and said cooling fan, said OEM drive pulley including a sheave and a circular harmonic balancer positioned behind said sheave, said assembly comprising:

a. a mounting bracket for attaching said hydraulic pump to the front of said OEM engine;

b. a pulley ring shrink-fit over said harmonic balancer, said pulley ring being equipped with one or more external grooves to facilitate placement and retention of a drive belt thereon; and c. an auxiliary drive belt placed around said pulley ring and a sheave on said hydraulic pump to thereby drive said pump.

7. An assembly as in claim 6, and further comprising:

a. at least one idler pulley attached to said bracket for directing said auxiliary drive belt.

8. An assembly as in claim 6, and further comprising:

a. a tensioning pulley attached to said bracket for tensioning said auxiliary drive belt.

9. A method of attaching a rotary driven hydraulic pump to an OEM engine, said engine including a cooling fan and a fan belt which is attached between an OEM drive pulley attached to an engine crankshaft and said cooling fan, said OEM drive pulley including a sheave and a circular harmonic balancer positioned behind said sheave, said method comprising the steps of:

a. removing said OEM drive pulley from said crankshaft;

b. machining said harmonic balancer to yield a true outside diameter;

c. heating a pulley ring with an inside diameter which, before heating, is slightly less than the outside diameter of said harmonic balancer, said heating step expanding said pulley ring such that it has an inside diameter slightly greater than the outside diameter of said harmonic balancer;

d. placing the heated pulley ring around said harmonic balancer and cooling said pulley ring to shrink-fit it around said harmonic balancer;

e. installing said OEM fan drive on said crankshaft; and f. placing an auxiliary drive belt around said pulley ring and a sheave on said hydraulic pump to thereby drive said pump.

10. A method as in claim 9, and further comprising the steps of:

a. attaching a support bracket to said OEM engine;

b. attaching said hydraulic pump to said support bracket prior to placement of said auxiliary drive belt.

11. A method as in claim 10, and further comprising the steps of:

a. installing a plurality of idler pulleys on said bracket;

b. installing at least one tensioning pulley on said bracket; and c. said auxiliary belt placing step includes the step of threading said auxiliary drive belt through said idler pulleys and said tensioning pulley.

* * * * *